US012473100B2

(12) United States Patent
Koyama et al.

(10) Patent No.: US 12,473,100 B2
(45) Date of Patent: Nov. 18, 2025

(54) EXTENSIBLE BOOM, SOLAR CELL PADDLE, AND EXTENSIBLE BOOM MANUFACTURING METHOD

(71) Applicant: Mitsubishi Electric Corporation, Tokyo (JP)

(72) Inventors: Tatsuya Koyama, Tokyo (JP); Hiroki Kobayashi, Tokyo (JP); Kazunori Takagaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 223 days.

(21) Appl. No.: 18/273,785

(22) PCT Filed: Feb. 8, 2021

(86) PCT No.: PCT/JP2021/004612
§ 371 (c)(1),
(2) Date: Jul. 24, 2023

(87) PCT Pub. No.: WO2022/168319
PCT Pub. Date: Aug. 11, 2022

(65) Prior Publication Data
US 2024/0083600 A1    Mar. 14, 2024

(51) Int. Cl.
*B64G 1/44* (2006.01)
*H02S 20/30* (2014.01)
*H02S 30/20* (2014.01)

(52) U.S. Cl.
CPC ............. *B64G 1/443* (2013.01); *H02S 30/20* (2014.12); *H02S 20/30* (2014.12)

(58) Field of Classification Search
CPC .... B64G 1/2225; B64G 1/2227; B64G 1/222; B64G 1/44; B64G 1/443; B64G 1/446;
(Continued)

(56) References Cited

U.S. PATENT DOCUMENTS 3,177,987 A * 4/1965 Swaim ............... H01Q 1/087
138/156
3,357,457 A * 12/1967 Myer ................. F16L 9/02
52/108
(Continued)

FOREIGN PATENT DOCUMENTS

JP       S59-155751 U    10/1984
JP       S60-21000 U     2/1985
(Continued)

OTHER PUBLICATIONS

Extended European Search Report (EESR) issued Mar. 25, 2024, in corresponding European Patent Application No. 21924709.5, 8 pages.
(Continued)

Primary Examiner — Theodore V Adamos
(74) Attorney, Agent, or Firm — XSENSUS LLP

(57) ABSTRACT

An extensible boom is extended in an extension direction from a state of being rolled in a cylindrical form, the extension direction being one of short directions of the cylindrical form. Protruding portions and recessed portions are alternately formed at each of one end and another end in a long direction of the cylindrical form. The protruding portions at the one end are located opposite the recessed portions at the other end. The recessed portions at the one end are located opposite the protruding portions at the other end. When the extensible boom is extended along the extension direction, the protruding portions at the one end engage with the recessed portions at the other end, and the recessed portions at the one end engage with the protruding portions at the other end, such that a cylindrical shape is formed along the extension direction.

17 Claims, 4 Drawing Sheets

(58) Field of Classification Search
CPC .......... F16L 11/121; F16L 11/02; F16L 11/08; B65H 75/34; B65H 2701/332; B65H 75/4402; B65H 75/4471; E04C 3/005; B32B 7/022; B32B 1/08; B32B 3/08; B32B 5/12; B32B 5/26; B32B 3/06; B32B 37/10; H01Q 1/087; H02S 20/30; H02S 30/20

See application file for complete search history.

(56) References Cited

U.S. PATENT DOCUMENTS

| | | | | |
|---|---|---|---|---|
| 3,360,894 | A * | 1/1968 | Orr | F16H 19/064 |
| | | | | 24/20 R |
| 3,473,758 | A * | 10/1969 | Valentijn | B64G 1/2225 |
| | | | | 244/172.6 |
| 3,735,942 | A | 5/1973 | Palz | |
| 3,735,943 | A | 5/1973 | Fayet | |
| 4,490,422 | A * | 12/1984 | Pascher | B29C 61/10 |
| | | | | 138/167 |
| 6,256,938 | B1 * | 7/2001 | Daton-Lovett | H01Q 1/087 |
| | | | | 138/119 |
| 7,610,938 | B2 * | 11/2009 | Yanokura | B21K 1/10 |
| | | | | 138/168 |
| 9,004,410 | B1 | 4/2015 | Steele et al. | |
| 9,079,673 | B1 | 7/2015 | Steele et al. | |
| 10,276,334 | B2 * | 4/2019 | Meier | H01H 33/04 |
| 2007/0262204 | A1 | 11/2007 | Beidleman et al. | |
| 2011/0192444 | A1 | 8/2011 | Beidleman et al. | |
| 2011/0204186 | A1 | 8/2011 | Keller et al. | |
| 2011/0210209 | A1 | 9/2011 | Taylor et al. | |
| 2012/0012154 | A1 | 1/2012 | Keller et al. | |
| 2012/0090660 | A1 | 4/2012 | Keller et al. | |
| 2012/0297717 | A1 | 11/2012 | Keller et al. | |
| 2013/0061541 | A1 * | 3/2013 | Taylor | F16S 5/00 |
| | | | | 52/741.1 |
| 2013/0186011 | A1 | 7/2013 | Keller et al. | |
| 2016/0114910 | A1 | 4/2016 | Steele et al. | |
| 2016/0137319 | A1 | 5/2016 | Steele et al. | |
| 2017/0297749 | A1 | 10/2017 | Steele et al. | |
| 2018/0170583 | A1 | 6/2018 | Steele et al. | |
| 2020/0122861 | A1 * | 4/2020 | Baudassé | B64G 1/2225 |
| 2020/0122862 | A1 * | 4/2020 | Baudassé | B64G 1/2225 |

FOREIGN PATENT DOCUMENTS

| | | | |
|---|---|---|---|
| JP | 2669180 | B2 | 10/1997 |
| JP | H09-285327 | A | 11/1997 |
| JP | 2006-130988 | A | 5/2006 |
| JP | 2007-168509 | A | 7/2007 |
| JP | 5882151 | B2 | 3/2016 |
| JP | 2018-144366 | A | 9/2018 |
| WO | WO-2019122856 | A1 * | 6/2019 ............ B32B 1/00 |

OTHER PUBLICATIONS

International Search Report and Written Opinion mailed on Apr. 27, 2021, received for PCT Application PCT/JP2021/004612, filed on Feb. 8, 2021, 8 pages including English Translation.

Notice of Reasons for Refusal mailed on Sep. 28, 2021, received for JP Application No. 2021-532952, 7 pages including English Translation.

* cited by examiner

EXTENSIBLE BOOM, SOLAR CELL PADDLE, AND EXTENSIBLE BOOM MANUFACTURING METHOD

CROSS-REFERENCE TO RELATED APPLICATION

The present application is based on PCT filing PCT/JP2021/004612, filed Feb. 8, 2021, the entire contents of which are incorporated herein by reference.

TECHNICAL FIELD

The present disclosure relates to an extensible boom, a solar cell paddle, and an extensible boom manufacturing method.

BACKGROUND ART

To keep up with increasing power consumption on artificial satellites, upsizing of photovoltaic power generation panels is desired. For accommodating upsizing of photovoltaic power generation panels, a method that retracts photovoltaic power generation panels in a cylindrical shape has been developed as a way of retracting photovoltaic power generation panels. In the method, the photovoltaic power generation panels are deployed by extending a mast. The method also provides high efficiency in retraction of photovoltaic power generation panels compared to a conventional method in which photovoltaic power generation panels are retracted by being alternately folded. In the method that retracts photovoltaic power generation panels in a cylindrical shape, an extensible boom using a member with bidirectional stability is used as the mast. Here, the member with bidirectional stability is a member that can maintain each of a shape at the time of retraction and a shape at the time of extension without external force. An extensible boom assumes a cylindrical shape when it is retracted and becomes a mast when it is extended. The mast needs to be rigid in order to support the structure of the mast formed by the extensible boom upon extension.

As a way of attaining the rigidity of a mast formed by an extensible boom upon extension, Patent Literature 1 discloses a technique of combining a pair of curved boom members and covering the periphery of the combined boom members with cladding.

CITATION LIST

Patent Literature

Patent Literature 1: JP 5882151 B

SUMMARY OF INVENTION

Technical Problem

In the technique disclosed by Patent Literature 1, two booms are retracted as one piece, so there is a difference between an inner diameter and an outer diameter due to the thicknesses of the individual booms at the time of retraction. Consequently, partial curvature, relative misalignment between the booms, and the like occur, which poses a problem of being unable to perform smooth retraction and extension of the booms. The influence of the difference between the inner diameter and the outer diameter can be relatively lessened by decreasing the thicknesses of the booms; however, booms with a reduced thickness result in lower tensile rigidity and bending rigidity, which leads to a problem of significant constraints in design of a photovoltaic power generation panel or the like. Accordingly, there is a need for a single extensible boom that secures the rigidity of a mast formed by an extensible boom upon extension.

An object of the present disclosure is to provide a single extensible boom that secures the rigidity of the mast formed by an extensible boom upon extension.

Solution to Problem

Advantageous Effects of Invention

The extensible boom according to the present disclosure is a single extensible boom. Also, the rigidity of the mast formed by the extensible boom upon extension is secured by the engagement of the protruding portions and the recessed portions during extension of the extensible boom along the extension direction. Thus, according to the present disclosure, a single extensible boom that secures the rigidity of the mast formed by the extensible boom upon extension can be provided.

DESCRIPTION OF EMBODIMENTS

Figure 1:
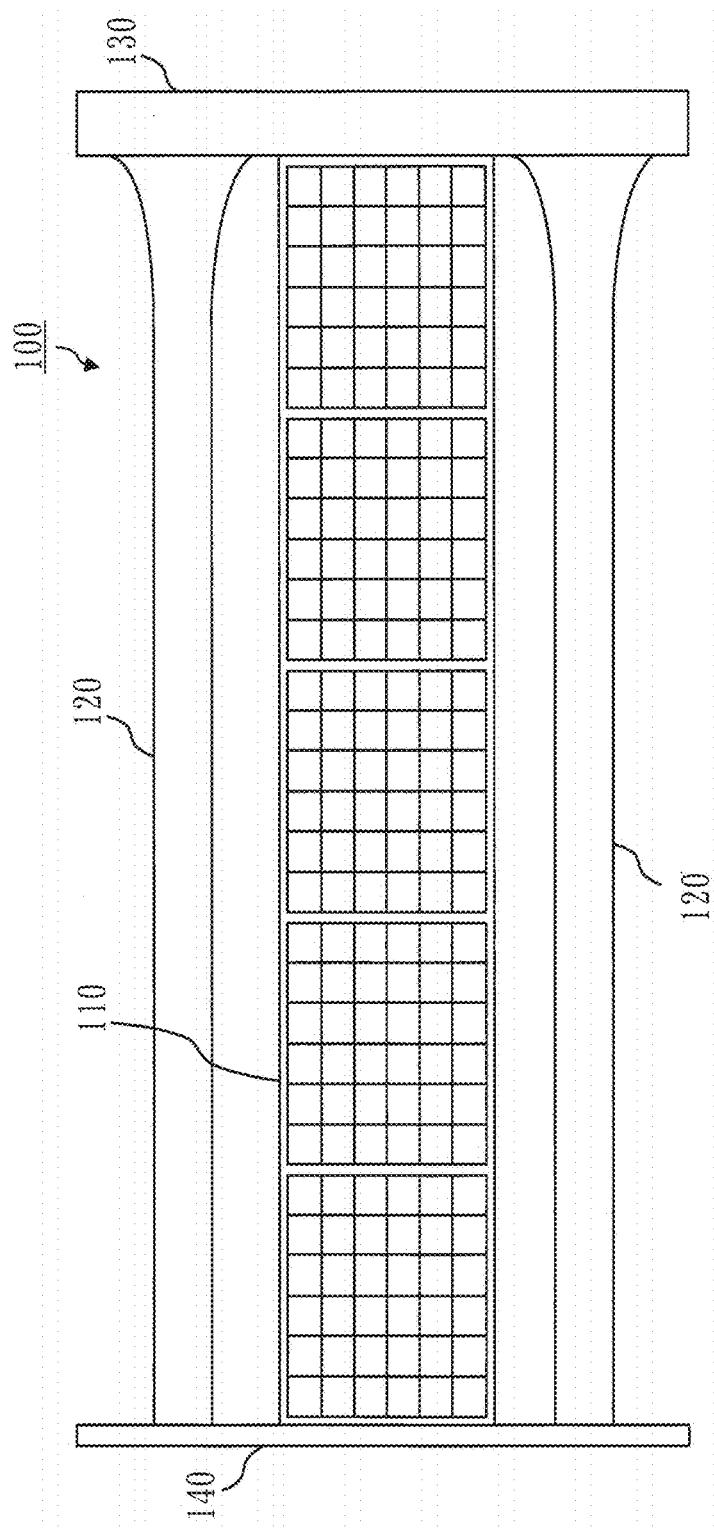
FIG. 1 is a schematic illustration showing a specific example of a solar cell paddle 100 according to Embodiment 1.

In the description of embodiments and drawings, the same elements and corresponding elements are given the same reference numerals. Discussion on elements with the same reference numeral is simplified or omitted as appropriate.

Embodiment 1

Embodiment 1 will be described in detail below with reference to drawings.

Description of Structure

FIG. 1 shows a schematic illustration depicting a specific example of a solar cell paddle 100 according to this embodiment. The solar cell paddle 100 is also called a solar cell paddle for an artificial satellite. In FIG. 1, the solar cell paddle 100 in an extended state is shown. The extended state is also called a deployed state. In order to keep a flexible solar cell bracket 110 in the deployed state, the solar cell paddle 100 includes an extensible boom 120 and a beam 140. When the solar cell paddle 100 is in a retracted state, the extensible boom 120 and the flexible solar cell bracket 110 wind around a support structure portion 130. The solar cell paddle 100 in the retracted state is shorter than the solar cell paddle 100 in the extended state. The retracted state is a state where the solar cell paddle 100 is retracted. In the retracted state, the extensible boom 120 is retracted by being rolled in a cylindrical form. The extended state is a state where the solar cell paddle 100 is deployed. In the extended state, the extensible boom 120 is extended. The extensible boom 120 is extended in an extension direction from the state of being rolled in a cylindrical form, the extension direction being one of short directions of the cylindrical form.

Figure 2:
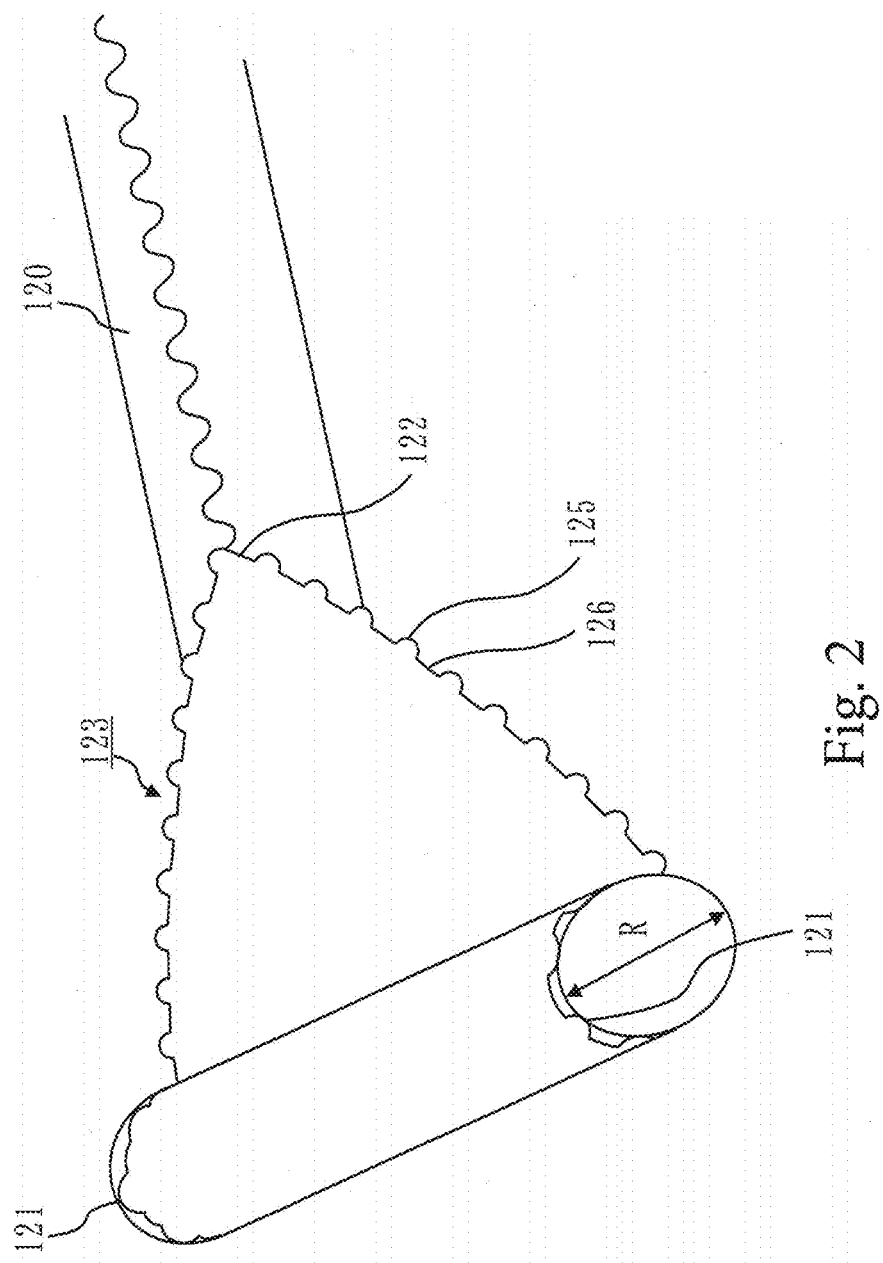
FIG. 2 illustrates an extensible boom 120 according to Embodiment 1.

FIG. 2 shows an enlarged view of the extensible boom 120 in a portion near the support structure portion 130. Cylinder ends 121 are one end and the other end in the long direction of the extensible boom 120 in the retracted state. The long direction is a direction perpendicular to a face representing a bottom surface of a retraction cylinder, which is the cylindrical form in the retracted state. Although in practice the support structure portion 130 is present as the center axis of the retraction cylinder, the support structure portion 130 is omitted in FIG. 2. Protruding portions 125 and recessed portions 126 are alternately formed at each of one end and the other end of the retraction cylinder in the long direction, where the protruding portions 125 and the recessed portions 126 are staggered at the cylinder ends 121. Specifically, the respective protruding portions 125 at one end are located opposite the respective recessed portions 126 at the other end, while the respective recessed portions 126 at one end are located opposite the respective protruding portions 125 at the other end. The protruding portions 125 protrude in the long direction of the retraction cylinder and also called projections. The recessed portions 126 are recessed in the long direction of the retraction cylinder and also called hollows. When the extensible boom 120 rolled in a cylindrical form is extended along the extension direction, the protruding portions 125 at one end engage with the recessed portions 126 at the other end located opposite those protruding portions 125 at one end, and the recessed portions 126 at one end engage with the protruding portions 125 at the other end located opposite those recessed portions 126 at one end, respectively, at an engagement start point 122, thus forming an extension cylinder. The extension cylinder is a cylindrical shape that is formed when the extensible boom 120 is in the extended state. A portion of the extension cylinder is shown on the right hand side of FIG. 2. The shape of the extensible boom 120 when it is extended is a cylinder with the axis in the extension direction being the center axis. Here, the extension direction is the direction in which the extensible boom 120 in the retracted state is extended, being one of the short directions of the cylinder and a direction that intersects with the long direction of the cylinder. When the extensible boom 120 is extended from the state of being rolled in a cylindrical form along the extension direction, the protruding portions 125 at one end engage with the recessed portions 126 at the other end located opposite those protruding portions 125 at the one end, respectively, and the recessed portions 126 at one end engage with the protruding portions 125 at the other end located opposite those recessed portions 126 at the one end, respectively, such that a cylindrical shape is formed along the extension direction. This cylindrical shape is the extension cylinder.

An engagement wall surface 123 consists of outer edges of the protruding portions 125 and outer edges of the recessed portions 126. The engagement wall surface 123 is also called a projection engagement wall surface. The shape of the engagement wall surface 123 is an involute curve, which is used with gears or the like, as a specific example. In this example, smooth engagement of the protruding portions 125 and the recessed portions 126 is achieved. The shape of the engagement wall surface 123 can be a curve combining the curves of the outer edges of the protruding portions 125 and the curves of the outer edges of the recessed portions 126, as a specific example. The shape of the engagement wall surface 123 can consist of straight lines and curved lines or consist only of straight lines. The shape of the engagement wall surface 123 may also be a cycloid curve. The shape of at least any outer edge of each protruding portion 125 and the shape of at least part of at least any outer edge of each recessed portion 126 may be each an involute curve or a cycloid curve. The shape of the engagement wall surface 123 can be any curve that can achieve smooth engagement of the protruding portions 125 and the recessed portions 126 and that has a convex profile. From the perspective of facilitating the manufacture of the extensible boom 120, the shape of the curve is preferably a shape that is uniquely determined by a function which can be easily numerically controlled. In cases where making a curve on the engagement wall surface 123 is difficult, for example, when the extensible boom 120 is manufactured by manual cutting, the shape of the engagement wall surface 123 may be a shape consisting of straight lines such as rectangles, instead of making the shape of the engagement wall surface 123 a curve.

An engaged state, in which the protruding portions 125 and the recessed portions 126 engage with each other, may be an abutting state in which the protruding portions 125 abut on the recessed portions 126 or a seated state in which the protruding portions 125 sit on or below the recessed portions 126. While the seated state is preferred for the extensible boom 120 to have higher rigidity, the abutting state is preferred if the extensible boom 120 is repeatedly retracted and extended. In the case of implementing the seated state, it is preferable to warp the protruding portions 125 upward or downward so that the protruding portions 125 smoothly sit onto or below the recessed portions 126. In the case of implementing the abutting state, making the shape of the protruding portions 125 symmetrical with the shape of the recessed portions 126 is preferred because it allows the protruding portions 125 and the recessed portions 126 to engage with each other without clearance in the engaged state.

In order to achieve smoother engagement of the protruding portions 125 and the recessed portions 126, an auxiliary mechanism may be disposed on the extensible boom 120 or the like, such as providing a presser near the engagement start point 122 as a specific example. The presser is a component separate from the extensible boom and having a function of assisting in the engagement of the protruding portions 125 and the recessed portions 126. Specifically, the presser serves to guide the protruding portions 125 and the recessed portions 126 so as to make the protruding portions 125 and the recessed portions 126 engage each other properly.

Figure 3:
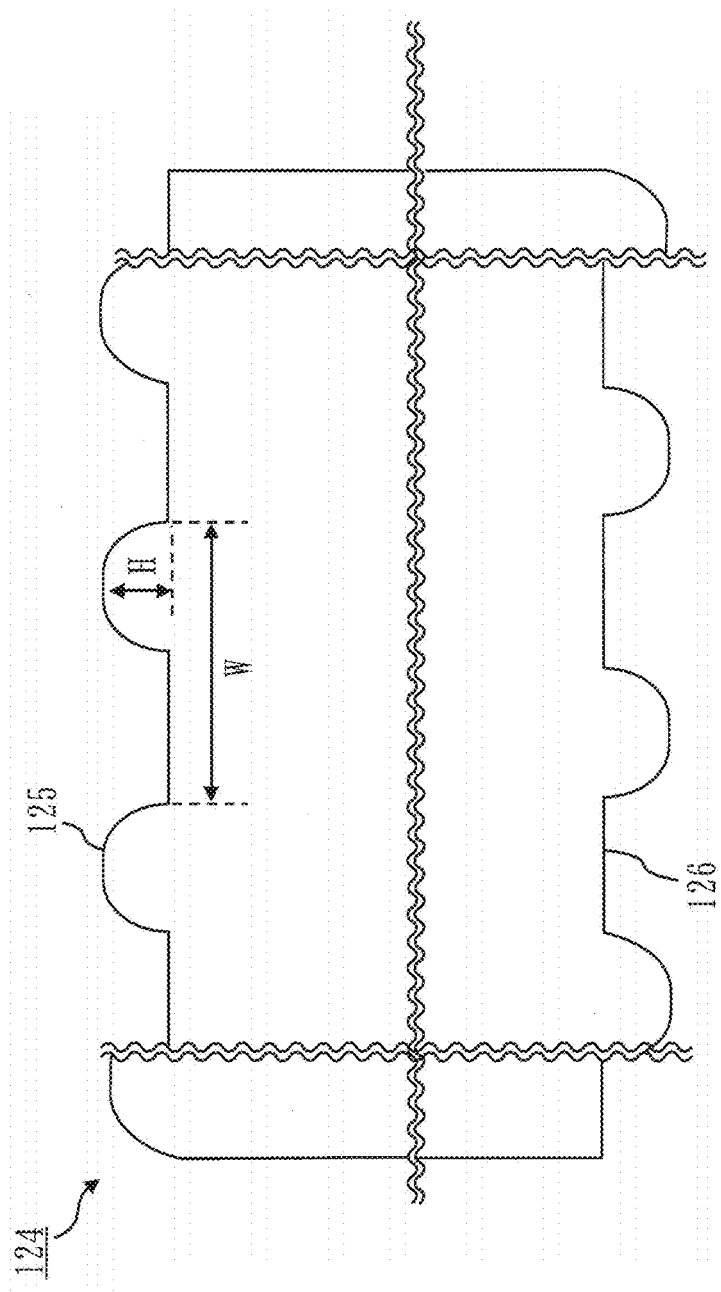
FIG. 3 is a schematic illustration of a CFRP (Carbon Fiber Reinforced Plastics) prepreg 124 according to Embodiment 1.

When R is a diameter of a cross section of the retraction cylinder parallel to a portion representing the bottom surface of the retraction cylinder and H is the height of the protruding portions 125, the value of H/R, which is the ratio of R to H, is preferably greater than 0 and 0.5 or smaller for enhancing the stability of the shape of the retraction cylinder. Here, the height H of the protruding portions 125 indicates a length from a lower end of a recessed portion 126 at one end to an upper end of the protruding portion 125 at the same end along the long direction, as shown in FIG. 3. The height H is also a length from the position representing the minimum of the recessed portion 126 at one end to the position representing the maximum of the protruding portion 125 at the same end along the long direction. Here, the upper end and the lower end are determined based on one of the long directions of the retraction cylinder. Considering that, in the extended state, the protruding portions 125 and the recessed portions 126 become a curved surface, the height H is a length measured in the retracted state. The height of the protruding portion 125 is H/2 and the height of the recessed portion 126 is H/2.

The value of H/R is relevant to stability in transition from the extended state to the retracted state. During the transition, the shape of the protruding portions 125 and the shape of the recessed portions 126 change. If the height of the protruding portions 125 is too large relative to the diameter R, balance between the protruding portions 125 and the recessed portions 126 becomes bad. Particularly when the value of H/R is greater than 0.5, the transition does not occur smoothly and, because of change in the rigidity of the retraction cylinder in the long direction when in the retracted state, the shape of the retraction cylinder becomes unstable. Also, since H and R are real numbers, the lower limit of the value of H/R is greater than 0. The closer the value of H/R is to 0, the lower the effect of engagement between the protruding portions 125 and the recessed portions 126 will be; a preferable lower limit of H/R is 0.0001.

Here, because the cross section of the retraction cylinder, the cross section being parallel to the portion representing the bottom surface of the retraction cylinder, is in fact not a perfect circle, the diameter R is an equivalent circle diameter calculated from the area of the cross section of the retraction cylinder, the cross section being parallel to the portion representing the bottom surface of the retraction cylinder. Also, while the diameter R is illustrated in FIG. 2 by using a retraction cylinder in a state where a portion of the extensible boom 120 is extended, the illustration of the diameter R in FIG. 2 is merely an indication of the concept of the diameter R. The diameter R is typically defined for the retraction cylinder in a state where the extensible boom 120 is completely retracted. The diameter R indicates a length corresponding to the diameter of the outer profile of the cross section orthogonal to the long direction of the retraction cylinder.

When the diameter R is the foregoing and the total length of a pair of a protruding portion 125 and a recessed portion 126 adjacent to each other along the extension direction is represented as W, the value of W/R, which is the ratio of R to W, is preferably greater than 0 and 0.6 or smaller for enhancing the stability of the shape of the retraction cylinder. The value of W/R is a metric showing the number of protruding portions 125 and recessed portions 126 that are present in the range of one round along the perimeter of the retraction cylinder. When the value of W/R exceeds 0.6, the shape of the retraction cylinder becomes a shape other than a circle, such as a square as a specific example, due to the influence of the difference between the rigidity of the protruding portions 125 and the rigidity of the recessed portions 126 in the long direction on the retraction cylinder. As a result, large vibration occurs when the extensible boom 120 is being extended, and in the worst case, the solar cell paddle 100 is damaged. Also, since W and R are real numbers, the lower limit of the value of W/R is greater than 0. The closer the value of W/R is to 0, the lower the effect of engagement between the protruding portions 125 and the recessed portions 126 will be; a preferable lower limit of W/R is 0.0001.

Considering that, in the retracted state, the protruding portions 125 and the recessed portions 126 become a curved surface, the length W is a length measured in the extended state.

FIG. 3 shows a schematic illustration of a CFRP prepreg 124. The CFRP prepreg 124 is shaped into the extension cylinder. The CFRP prepreg 124 is made of fiber and resin. As a specific example, the CFRP prepreg 124 is made of T800 from Toray Industries, Inc., plain-woven with thermosetting epoxy resin. FIG. 3 illustrates the CFRP prepreg 124 as cut such that the protruding portions 125 and the recessed portions 126 engage with each other in the extended state and such that the protruding portions 125 at one end are located opposite the recessed portions 126 at the other end and the recessed portions 126 at the one end are located opposite the protruding portions 125 at the other end. When the CFRP prepreg 124 is shaped into the extension cylinder, the CFRP prepreg 124 may be wrapped around a cylindrical fixture, or release film may be used to prevent the protruding portions 125 and the recessed portions 126 from fixing to each other via the resin. The release film may be placed such that it lies between the one end and the other end upon shaping of the extension cylinder or may be placed such that it entirely covers one surface of the CFRP prepreg 124 prior to shaping of the extension cylinder. When the protruding portions 125 are provided with warp as mentioned above, release film may be placed only over one surface of the protruding portions 125 and a portion of the periphery of the one surface of the protruding portions 125 to control the amount of warp with the thickness of the release film or the like.

Rather than making the protruding portions 125 and the recessed portions 126 before shaping the CFRP prepreg 124 into the extension cylinder, the protruding portions 125 and the recessed portions 126 may be made such as by machining after shaping the CFRP prepreg 124 into the extension cylinder, thereby creating the shape of the extensible boom 120 in the extended state. However, if the protruding portions 125 and the recessed portions 126 are made after shaping into the extension cylinder, it is necessary to make them while deforming the extensible boom. Accordingly, in such a case, there will be risk of reduction in the strength of the mast due to occurrence of damage such as cracks caused by pressing and vibration and occurrence of deformation associated with creeping. For this reason, a procedure that makes the protruding portions 125 and the recessed portions 126 before shaping of the extension cylinder is preferable to a procedure that makes the protruding portions 125 and the recessed portions 126 after shaping of the extension cylinder because the extensible boom 120 can be manufactured easily and at lower risk.

By using fiber-reinforced plastic for the material of the extensible boom 120, a light-weight extensible boom can be provided. When fiber-reinforced plastic is used, the resin may be thermosetting resin such as cyanate resin and phenol resin or may be thermoplastic resin. The fiber can be glass fiber, SiC fiber, or the like, aside from carbon fiber. Processing fiber into fabric is preferred because it can provide an extensible boom 120 that is thin and has a smaller difference between the inner diameter and the outer diameter in the retracted state. In a case where the difference between the inner diameter and the outer diameter is acceptable, the extensible boom 120 may be manufactured using a material formed of lamination of unidirectional material. A specific example of the way of weaving the fabric is twill. The fiber-reinforced plastic may be woven, and the fiber-reinforced plastic may be woven in two or more directions. The fiber is preferably continuous fiber but it may also be short or long fiber. In a case where the weight of the extensible boom 120 is acceptable, a single material may be used in place of a composite material; the extensible boom 120 may be manufactured using metal such as steel material like stainless, a copper alloy, a titanium alloy, or an aluminum alloy. When metal is used as the material for the extensible boom 120, the extensible boom 120 may be manufactured by means of cutting, but preferably plastic working is employed instead of cutting. As plastic working, the extensible boom 120 may be manufactured by cold working, warm working, or hot working.

A procedure of manufacturing the extensible boom 120 corresponds to an extensible boom manufacturing method. The extensible boom manufacturing method is a method of manufacturing the extensible boom 120 by alternately forming the protruding portions 125 and the recessed portions 126 at each of one end and the other end of a material, where the one end and the other end in a direction that intersects the extension direction are parallel, and rolling the material in a cylindrical form along a direction that intersects the extension direction. The direction that intersects the extension direction can be a direction orthogonal to the extension direction, as a specific example.

Description of Effects of Embodiment 1

As described above, the extensible boom 120 according to this embodiment is a single extensible boom. Also, engagement of the protruding portions 125 and the recessed portions 126 during extension of the extensible boom 120 secures the rigidity of the mast which is formed by the extensible boom 120 upon extension.

With regard to the rigidity of the mast formed by the extensible boom upon extension, tensile rigidity and bending rigidity in the extension direction can be easily obtained by controlling the thickness of the extensible boom or the like. However, for the mast to have torsional rigidity, it is necessary to prevent misalignment in the extension direction by making a closed section as the shape of the cross section of the mast orthogonal to the extension direction, regarding the mast which is the extended extensible boom.

According to this embodiment, the extensible boom 120 when extended is a single boom yet it has a closed section in the cross section orthogonal to the extension direction, so that deformation in the extension direction is constrained by interference between the protruding portions 125 and the recessed portions 126. Thus, the mast, which is the extended extensible boom 120, has torsional rigidity. Further, according to this embodiment, a mast with torsional rigidity can be provided by an extensible boom 120 having a relatively simple mechanism.

Embodiment 2

Figure 4:
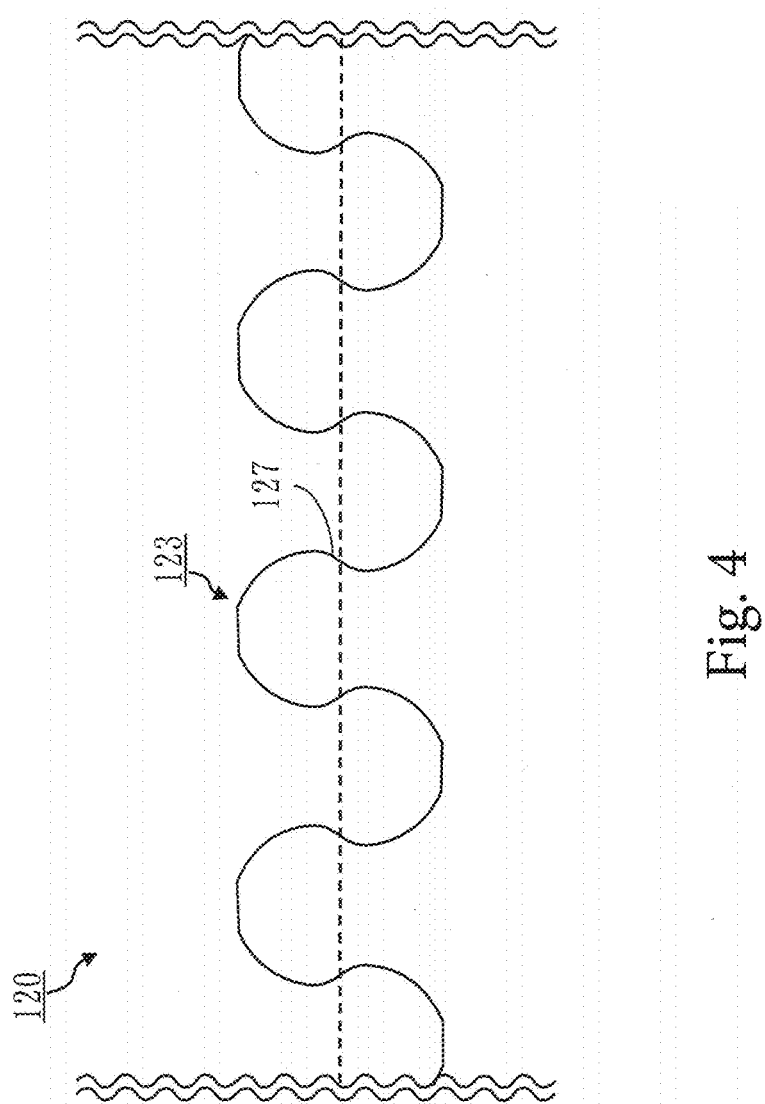
FIG. 4 illustrates an undercut portion 127 according to Embodiment 2.

Differences primarily from the foregoing embodiment will be described below with reference to a drawing. This embodiment is characterized by the protruding portions 125 having undercuts.
Description of Structure FIG. 4 shows a schematic illustration of an engagement portion of the extensible boom 120 according to this embodiment. The drawing shows a portion of the extension cylinder. On an engagement wall surface 123, an undercut portion 127 is present near each recessed portion 126. Due to the presence of the undercut portion 127, disengagement of the protruding portion 125 and the recessed portion 126 is less likely to occur even if a force acting to disengage the protruding portions 125 and the recessed portions 126 is unexpectedly applied, because the undercut portions 127 at one end and the undercut portions 127 at the other end are caught on each other. Accordingly, the presence of the undercut portion 127 makes it possible to avoid a situation where the rigidity of the mast cannot be maintained.

Here, the undercut portion 127 is an undercut that is provided such that a protruding portion 125 at one end and a protruding portion 125 at the other end catch on one another in the extended state. In a case where the curve of the engagement wall surface 123 is an involute curve, the undercut portion 127 can be provided by giving a negative addendum modification coefficient.

For further suppression of disengagement of the protruding portions 125 and the recessed portions 126, the protruding portions 125 and the recessed portions 126 may have adhesive applied thereon. The adhesive can be adhesive of ultraviolet curing type as a specific example. In the present example, the portion where the protruding portion 125 and the recessed portion 126 engage each other will be fixed by curing of the adhesive due to the effect of ultraviolet ray in space after the solar cell paddle 100 is deployed in space.

The adhesive may also be adhesive of thermosetting type. Adhesive of thermosetting type cures with temperature rise due to sunshine. However, when adhesive of thermosetting type is used, adhesive with a curing temperature of 100° C. or higher is preferably used because the extensible boom 120 could not be deployed if the adhesive cures during standby on the ground.

Description of Effects of Embodiment 2

As described above, according to this embodiment, providing the undercut portion 127 in the protruding portions 125 makes the protruding portions 125 and the recessed portions 126 less likely to disengage in the extended state.

Other Embodiments

Arbitrary combination of the embodiments described above, or modification to any components of the embodiments, or omission of any components in the embodiments is possible.

Further, embodiments are not limited to those shown as Embodiments 1 and 2, but various modifications are possible where necessary. The procedures discussed in Embodiment 1 and 2 may be modified as appropriate.

REFERENCE SIGNS LIST

100: solar cell paddle; 110: solar cell bracket; 120: extensible boom; 121: cylinder end; 122: engagement start point; 123: engagement wall surface; 124: CFRP prepreg; 125: protruding portion; 126: recessed portion; 127: undercut portion; 130: support structure portion; 140: beam

The invention claimed is:

1. An extensible boom to be extended in an extension direction from a state of being rolled in a cylindrical form, the extension direction being one of short directions of the cylindrical form, wherein
protruding portions and recessed portions are alternately formed at each of one end and another end in a long direction of the cylindrical form,
the respective protruding portions at the one end are located opposite the respective recessed portions at the other end,
the respective recessed portions at the one end are located opposite the respective protruding portions at the other end, when the extensible boom is extended, along the extension direction, from the state of being rolled in the cylindrical form,
the protruding portions at the one end engage with the recessed portions at the other end located opposite those protruding portions at the one end, respectively,
the recessed portions at the one end engage with the protruding portions at the other end located opposite those recessed portions at the one end, respectively,
a cylindrical shape is formed along the extension direction,
the protruding portions and the recessed portions have ultraviolet curing adhesive or thermosetting adhesive applied thereon to bond the protruding portions to the recessed portions.

2. The extensible boom according to claim 1, wherein
the extensible boom is configured to be attached between a beam and a support structure,
a center axis of the cylindrical form is configured to receive the support structure,
the beam is to be attached to an unrolled portion of the extensible boom at a first side of the extensible boom, and
the support structure is to be disposed at a second side of the extensible boom opposite to the first side.

3. An extensible boom to be extended in an extension direction from a state of being rolled in a cylindrical form, the extension direction being one of short directions of the cylindrical form, wherein
protruding portions and recessed portions are alternately formed at each of one end and another end in a long direction of the cylindrical form,
the respective protruding portions at the one end are located opposite the respective recessed portions at the other end,
the respective recessed portions at the one end are located opposite the respective protruding portions at the other end,
when the extensible boom is extended, along the extension direction, from the state of being rolled in the cylindrical form,
the protruding portions at the one end engage with the recessed portions at the other end located opposite those protruding portions at the one end, respectively,
the recessed portions at the one end engage with the protruding portions at the other end located opposite those recessed portions at the one end, respectively,
a cylindrical shape is formed along the extension direction,
the protruding portions and the recessed portions formed at each of the one end and the other end in the long direction of the cylindrical form are configured to deform along an outer periphery of the cylindrical shape when the extensible boom is extended, along the extension direction, from the state of being rolled in the cylindrical form, such that the protruding portions at the one end engage with the recessed portions at the other end located opposite those protruding portions at the one end, respectively, and the recessed portions at the one end engage with the protruding portions at the other end located opposite those recessed portions at the one end, respectively, and
the protruding portions and the recessed portions have ultraviolet curing adhesive or thermosetting adhesive applied thereon to bond the protruding portions to the recessed portions.

4. The extensible boom according to claim 3, wherein
a shape of at least any outer edge of each of the protruding portions and a shape of at least part of at least any outer edge of each of the recessed portions are each an involute curve or a cycloid curve.

5. The extensible boom according to claim 3, wherein
the protruding portions each have an undercut.

6. The extensible boom according to claim 3, wherein
a value of a ratio H/R is greater than 0 and 0.5 or smaller, where R indicates a length corresponding to a diameter of an outer profile of a cross section orthogonal to the long direction of the cylindrical form, and H indicates a length, along the long direction, from a lower end of a recessed portion at the one end to an upper end of a protruding portion at the one end.

7. The extensible boom according to claim 3, wherein
a value of a ratio W/R is greater than 0 and 0.6 or smaller, where R indicates a length corresponding to a diameter of an outer profile of a cross section orthogonal to the long direction of the cylindrical form, and W indicates a total length, along the extension direction, of a pair of a protruding portion and a recessed portion adjacent to each other.

8. The extensible boom according to claim 3, wherein
the extensible boom is made of fiber-reinforced plastic.

9. The extensible boom according to claim 8, wherein
the fiber-reinforced plastic is woven, and
the fiber-reinforced plastic is woven in two or more directions.

10. The extensible boom according to claim 3, wherein
the extensible boom is configured to be attached between a beam and a support structure,
a center axis of the cylindrical form is configured to receive the support structure,
the beam is to be attached to an unrolled portion of the extensible boom at a first side of the extensible boom, and
the support structure is to be disposed at a second side of the extensible boom opposite to the first side.

11. A solar cell paddle for use with an artificial satellite, the solar cell paddle comprising:
the extensible boom according to claim 1.

12. A solar cell paddle for use with an artificial satellite, the solar cell paddle comprising:
the extensible boom according to claim 3.

13. An extensible boom manufacturing method of manufacturing an extensible boom, the method comprising:
alternately forming protruding portions and recessed portions at each of one end and another end of a carbon fiber reinforced plastics (CFRP) material, where the one end and the other end in a direction that intersects an extension direction are parallel, and rolling the material in a cylindrical form along a direction that intersects the extension direction; and
applying ultraviolet curing adhesive or thermosetting adhesive to the protruding portions and the recessed portions to bond the protruding portions to the recessed portions, wherein
the respective protruding portions at the one end are located opposite the respective recessed portions at the other end,
the respective recessed portions at the one end are located opposite the respective protruding portions at the other end,
when the extensible boom is extended, along the extension direction, from a state of being rolled in the cylindrical form, the protruding portions at the one end engage with the recessed portions at the other end located opposite those protruding portions at the one end, respectively, the recessed portions at the one end engage with the protruding portions at the other end located opposite those recessed portions at the one end, respectively, a cylindrical shape is formed along the extension direction, and the protruding portions and the recessed portions formed at each of the one end and the other end in the long direction of the cylindrical form are configured to deform along an outer periphery of the cylindrical shape when the extensible boom is extended, along the extension direction, from the state of being rolled in the cylindrical form, such that the protruding portions at the one end engage with the recessed portions at the other end located opposite those protruding portions at the one end, respectively, and the recessed portions at the one end engage with the protruding portions at the other end located opposite those recessed portions at the one end, respectively.

14. The method of manufacturing an extensible boom according to claim 13, wherein forming the protruding portions and the recessed portions includes cutting the material before rolling the material into the cylindrical form, such that the protruding portions at the one end are located opposite the recessed portions at the other end and the recessed portions at the one end are located opposite the protruding portions at the other end.

15. The method of manufacturing an extensible boom according to claim 13, further comprising placing a release film between the one end and the other end of the material during rolling into the cylindrical form to prevent the protruding portions and the recessed portions from fixing to each other.

16. The method of manufacturing an extensible boom according to claim 13, wherein the material comprises the CFRP material woven in two or more directions, and forming the protruding portions and the recessed portions includes cutting the fiber-reinforced plastic to create the alternating pattern.

17. The method of manufacturing an extensible boom according to claim 13 further comprising attaching the extensible boom between a beam and a support structure, wherein the support structure is disposed inside the cylindrical form, the beam is attached to an unrolled portion of the extensible boom at a first side of the extensible boom, and the support structure is disposed at a second side of the extensible boom opposite to the first side.

* * * * *